(12) United States Patent
Hashiba et al.

(10) Patent No.: US 6,412,222 B1
(45) Date of Patent: Jul. 2, 2002

(54) SLIDE DOOR

(75) Inventors: Yasuhiro Hashiba; Ryota Kadonishi, both of Kanagawa (JP)

(73) Assignee: Shiroki Kogyo Co., Ltd., Kanagawa (JP)

(*) Notice: Subject to any disclaimer, the term of this patent is extended or adjusted under 35 U.S.C. 154(b) by 0 days.

(21) Appl. No.: 09/600,853

(22) PCT Filed: Nov. 19, 1999

(86) PCT No.: PCT/JP99/06465
§ 371 (c)(1),
(2), (4) Date: Jul. 24, 2000

(30) Foreign Application Priority Data

Nov. 24, 1998 (JP) .......................................... 10-332734

(51) Int. Cl.$^7$ .............................................. E05D 15/48
(52) U.S. Cl. .............................. 49/168; 49/163; 49/360; 296/155
(58) Field of Search .......................... 49/360, 279, 280, 49/163, 168, 142; 296/155

(56) References Cited

U.S. PATENT DOCUMENTS 5,979,971 A * 11/1999 Mizuki et al. .............. 296/155
6,183,039 B1 * 2/2001 Kohut et al. ................ 296/155

FOREIGN PATENT DOCUMENTS

JP            10-58980     * 10/1998    ................ 296/155

* cited by examiner

Primary Examiner—Jerry Redman
(74) Attorney, Agent, or Firm—Finnegan, Henderson, Farabow, Garrett & Dunner, LLP

(57) ABSTRACT

A slide door is suitable for use in a vehicle slide door of a type where a window glass is lowered and a window is opened. This slide door includes an intermediate stopper mechanism. The intermediate stopper mechanism includes an intermediate striker disposed at a vehicle side, a first pole rotatably disposed at a slide door side and detachably engaged with the intermediate striker, a first latch which is a latch to engage with the first pole rotated to a position where it cannot abut on the intermediate striker and to restrain the first pole to that position, and which releases restraint of the first pole when a window glass of the slide door is opened to a predetermined position. By this structure, switching of the intermediate stopper mechanism can be carried out without fail.

7 Claims, 12 Drawing Sheets

SLIDE DOOR

TECHNICAL FIELD

The present invention relates to a slide door attached to a side or the like of a vehicle in an opening/closing enabled manner, and particularly to a slide door including an intermediate stopper mechanism for restraining the movement of the slide door, which is in an opening direction and is in the middle of opening, within a definite range.

BACKGROUND OF THE INVENTION

As shown in FIG. 8, a window glass 1 is disposed in a slide door 3 of a vehicle or the like in a rising/falling enabled manner. Thus, when the slide door 3 is opened while the window glass 1 is in a lower position, if an object is inserted in the window of this slide door 3, there is a fear that this object is pinched between a window frame 7 of the slide door 3 and a pillar 9, and receives damage.

Then, in order to avoid this situation, it is proposed that an intermediate stopper mechanism is provided, and when the window glass 1 is lowered to a position lower than a predetermined one, the slide door moving in the opening direction is stopped in the middle of opening.

As an example of this slide door, there is one as shown in FIG. 9.

First, in a period when the window glass 1 descends from a full-close state by a predetermined amount L (for example, 150 mm), an intermediate stopper control mechanism 11 pulls in a cable 13 (accurately, its inner cable) in accordance with this descending amount. On the other hand, when the movement stroke of the cable 13 reaches a set value, pulling in the cable 13 is stopped. However, even in this state, the window glass 1 can be lowered.

An intermediate stopper mechanism 15 is coupled with the intermediate stopper control mechanism 11 through the cable 13. This intermediate stopper mechanism 15 is driven by the intermediate stopper control mechanism 11, and is for stopping the slide door 3 moving in the opening direction in the middle of opening. An X-arm type wind regulator 16 is for driving the window glass 1 in the up-and-down direction.

Here, the structure of the intermediate stopper control mechanism 11 will be described in detail with reference to FIG. 10. A base plate 31 is fixed to an inner panel of the slide door 3, and a pin 33 is provided to stand on this base plate 31. A first lever 35 and a second lever 37 are rotatably attached to this pin 33.

A spiral spring 39 is wound around the pin 33, one end portion 39a of which is fastened to the first lever 35, and the other end portion 39b of which is fastened to the second lever 37.

A roller 41 is disposed at a rotation end of the first lever 35, and this roller 41 is engaged with a guide 17 provided at a lower portion of the window glass 1 movably in the horizontal direction in the drawing. A cable 13 is connected to the second lever 37.

Next, the structure of the intermediate stopper mechanism 15 will be described with reference to FIG. 11. A base plate 21 is fixed to the lower portion of the inner panel of the slide door 3, and a lever 22 is rotatably attached onto the base plate 21. The lever 22 is coupled with the cable 13, and is energized in the direction of an arrow I by not-shown energizing means. An elastic roller 24 is disposed at the tip of this lever 22. On the other hand, a step portion 28 capable of abutting on the roller 24 is formed at the side of a vehicle body 26.

In the foregoing conventional slide door 3, when the window glass 1 in the full-close state is lowered by using the window regulator 16, the first lever 35 is also rotated in the counterclockwise direction in FIG. 10 as the window glass 1 is lowered. Since the second lever 37 is also connected with the first lever 35 through the spiral spring 39, it is rotated in the counterclockwise direction, and pulls in the cable 13.

When the movement stroke of the cable 13 reaches a set value, the rotation of the second lever 37 is restrained, and it becomes impossible to rotate in accordance with the first lever 35. However, even in this state, the spiral spring 39 is elastically deformed to be shrunk, so that only the first lever 35 can rotate in the counterclockwise direction, and the window glass 1 can be lowered.

Thus, when the window glass 1 is lowered from the full-close state by the predetermined amount L or more, the intermediate stopper control mechanism 11 pulls in the cable 13 by a predetermined amount, and the lever 22 rotates against the energizing force of the not-shown energizing means, and moves from the position indicated by a two-dot-chain line in FIG. 11 to the position indicated by a solid line.

When the slide door 3 is moved in the opening direction in this state, the roller 24 abuts on the step portion 28 of the vehicle body side, and stops at the position, so that it becomes impossible to open the slide door 3 anymore.

Incidentally, it is designed such that the slide door 3 including such intermediate stopper mechanism 15 can be locked at the full-open position by a full open stopper mechanism. As shown in FIG. 12, a conventionally well-known full open stopper mechanism has such a structure that a roller 27 disposed at the side of the slide door 3 is movably engaged with a guide rail 23 at the vehicle side, a plate spring 25 with a part protruding in the guide rail 23 is provided, and the roller 27 causes this plate spring 25 to be elastically deformed and reaches the full-open position, so that the slide door is held at the full-open position.

In the slide door 3 including the intermediate stopper mechanism 15, even if the window glass 1 is lowered and an object is inserted in the window of the slide door 3, a space exists between the window frame 7 of the slide door 3 and the pillar 9 without fail in this situation, so that it is possible to avoid such a situation that the object inserted in the window is pinched. However, there are defects as described below.

(1) In the case where the window glass 1 is lowered from the full-open state, before the window glass 1 reaches the predetermined amount L, since the intermediate stopper control mechanism 11 gradually pulls the cable 13, the lever 22 is also gradually rotated. Thus, when the slide door 3 is strongly pulled in the opening direction in the state where the lowering amount of the window glass 1 is slightly smaller than the predetermined amount L, the roller 24 abuts on the step portion 28, and then, gets over this and advances, and the slide door 3 moves to the full-open position.

That is, at the time of switching operation of the intermediate stopper mechanism 15, the roller 24 is in a halfway state, in this halfway state, the roller 24 gets over the step portion 28 and advances. When the slide door 3 slides in this state, a large load is applied to the roller 24, the lever 22, the base plate 21, and the like, so that the durability of these parts is deteriorated, and in addition, an abnormal sound is produced, an open operating force of the slide door 3 is increased, and a feeling of operation becomes bad as well.

(2) When the window glass 1 is lowered by the predetermined amount L or more, it is necessary that the roller 24 certainly abuts on the step portion 28 of the vehicle body side and to stop the slide door 3. However, since the roller 24 is in the halfway state within a wide range, in order to obtain a certain operation, it is absolutely necessary to adjust the attachment state of the base plate 21 through trial and error.

(3) Through pulling the cable 13, in order to largely change the roller 24 from the position where it does not abut on the step portion 28 to the position where it abuts on the step portion, it is necessary to make the length r of the lever 22 long and to secure the magnification of a movement amount. Thus, an occupied space of an inner mechanism becomes large as the lever 22 becomes long.

(4) The intermediate stopper control mechanism 11 is physically independent from another mechanism. Besides, the first lever 35 is directly engaged with the window glass 1 having a large movement range. Thus, the first lever 35 becomes large, and a large occupied space is necessary.

(5) Since the energizing force of the energizing means to energize the lever 22 is such that the lever 22 is pressed in the lock direction, the energizing force of this energizing means cannot be made small thoughtlessly. On the other hand, the lever 22 is rotated and deformed against the energizing force of the energizing means by the force of lowering the window glass 1. Thus, the operation force of the window regulator 16 is large.

(6) In the case where the window glass 1 is lowered by an amount exceeding the predetermined amount L, it is necessary to shrink the spiral spring 39, and the operating force of the window regulator 16 is increased.

Incidentally, the foregoing slide door 3 has defects as described below with respect to the full-open stopper mechanism as well.

(1) In order for the full-open stopper mechanism to change into an unlock state or lock state, it is necessary that the roller 27 gets over the plate spring 25, and at this time, a large open operating force becomes necessary for the slide door 3.

(2) Since the movement of the roller 27 is prohibited by the plate spring 25 having no rigidity, the force to hold the slide door 3 at the full-open position is weak.

An object of the present invention is to provide a slide door which overcomes the defects of the conventional slide door.

That is, a first object of the invention is to provide a slide door in which a halfway state does not occur at switching of an intermediate stopper mechanism.

A second object is to provide a slide door in which an inner mechanism can be made compact, and adjustment at the time of assembling is unnecessary.

A third object is to provide a slide door in which an open/close operating force of the slide door and an operating force of a window glass is small and is not changed, and the operationally is superior.

DISCLOSURE OF THE INVENTION

The present invention relates to a slide door including an intermediate stopper mechanism, and the intermediate stopper mechanism includes an intermediate striker disposed at a vehicle side; a first pole rotatably provided at a slide door side and detachably engaged with the intermediate striker; first energizing means for energizing the first pole so that the first pole is returned to a position where it can abut on the intermediate striker; a first latch which is a latch to engage with the first pole rotated to a position where it cannot abut on the intermediate striker and to restrain the first pole at that position, and which releases restraint of the first pole when a window glass of the slide door is opened to a predetermined position; and second energizing means for energizing the first latch in a direction to make engagement with the first pole.

By this structure, in the slide door of the invention, at switching of the intermediate stopper mechanism, a halfway state does not occur. Besides, an internal structure can be made compact, and adjustment at the time of assembling becomes unnecessary, and further, an open/close operating force of the slide door and an operating force of the window glass are small and are not changed, and the operationally is also superior.

Moreover, in the invention, if an intermediate stopper control mechanism for driving the intermediate stopper mechanism in accordance with an opening degree of the window glass is attached to a window regulator, the intermediate stopper control mechanism can be made compact. As the intermediate stopper control mechanism, for example, it is possible to use one constituted by a cam disposed at a movable portion of the window regulator, and a lever rotatably disposed at a fixed portion of the window regulator, including an arm portion engagable with the cam, and being connected with the intermediate stopper mechanism through a transmission member.

The invention can also be provided with a full-open stopper mechanism, and this full-open stopper mechanism includes a full-open striker disposed at the vehicle body side; a second latch rotatably disposed at the slide door side and detachably engaged with the full-open striker; third energizing means for energizing the second latch so as to return the second latch to a position where it can abut on the full-open striker; a second pole which is engaged with the second latch engaged with the full-open striker and rotated to a lock position, and which restrains the second latch to the position; and fourth energizing means for energizing the second pole in a direction to make engagement with the second latch.

BEST MODE FOR CARRYING OUT THE INVENTION

For the purpose of describing the invention in more detail, embodiments of the invention will be described with reference to the accompanying drawings.

(Whole Structure)

Figure 1:
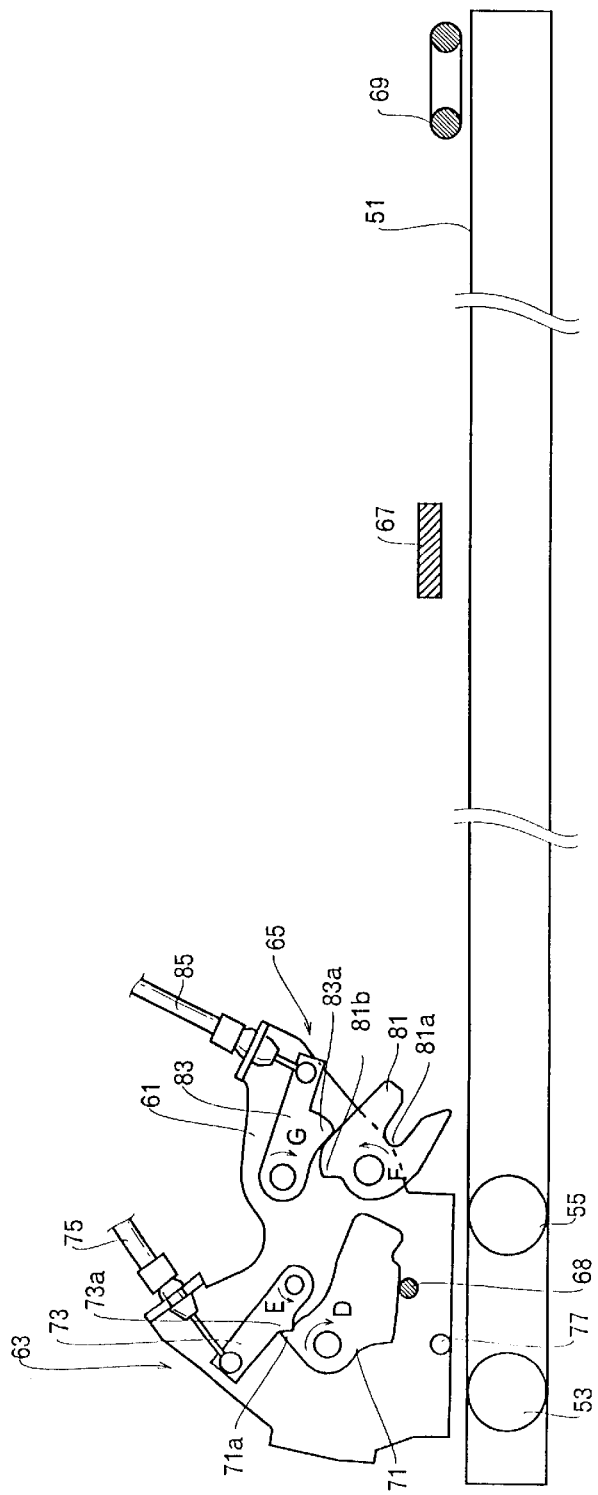
FIG. 1 is a view showing the whole structure of an intermediate stopper mechanism and a full-open stopper mechanism in an embodiment of the invention.

In FIG. 1, a guide rail 51 is disposed at a vehicle side. Rollers 53 and 55 are disposed at a slide door, and are movably engaged with the guide rail 51. By this, the slide door is guided by the guide rail 51, and becomes movable between a full-close position and a full-open position.

A base plate 61 disposed at a lower portion of the slide door is provided with an intermediate stopper mechanism 63 for stopping the slide door in the middle of movement in the opening direction, and a full-open stopper mechanism 65 for holding the slide door at the full-open position. FIG. 1 shows a state where the slide door is in the full-close position.

(Intermediate Stopper Mechanism)

An intermediate striker 67 to be engaged with the intermediate stopper mechanism 63 is disposed at the vehicle side. When the slide door moves from the full-close position to the full-open position, in the case where a window glass is opened by a predetermined amount or more, the intermediate stopper mechanism 63 abuts on the intermediate striker 67, and the further movement of the slide door in the opening direction is restrained.

Here, the intermediate stopper mechanism 63 will be described in detail. A first pole 71 capable of abutting on the intermediate striker 67 is rotatably disposed on the base plate 61. This first pole 71 is energized by the not-shown first energizing means in the direction of an arrow D.

Moreover, a first latch 73 is rotatably disposed on the baseplate 61. A protrusion 73a of the first latch 73 is engaged with a protrusion 71a of the first pole 71 having rotated to a position (rotation position shown in FIG. 1) where it does not abut on the intermediate striker 67, and the first latch restrains the first pole 71 to that position. This first latch 73 is energized by the not-shown second energizing means in the direction (direction of an arrow E) in which the protrusion 73a is engaged with the protrusion 71a of the first pole 71.

When the protrusion 73a of the first latch 73 is engaged with the protrusion 71a of the first pole 71, the rotation of the first pole 71 in the direction of the arrow D is prohibited.

The first latch 73 is connected with a cable 75 driven by an intermediate stopper control mechanism described later.

A pole pushing-back pin 68 as a pole returning member is disposed at the vehicle side. The pole pushing-back pin 68 abuts on the first pole 71 in the slide door during movement in the closing direction, and rotates the first pole 71 from a position where it can abut on the intermediate striker 67 to a position where it cannot abut on the intermediate striker. A stopper 77 protrudingly disposed on the base plate 61 abuts on the first pole 71 which is released from the restraint of the first latch 73, and stops the first pole 71 to this abutment position.

(Full-open Stopper Mechanism)

The full-open stopper mechanism 65 in FIG. 1 will be described. A full-open striker 69 which engages with the full-open stopper mechanism 65 when the slide door moves to the full-open position is disposed at the vehicle side. On the other hand, a second latch 81 in which an engaging groove 81a detachably engaged with the full-open striker 69 is formed, is rotatably disposed on the base plate 61. This second latch 81 is energized by the not-shown third energizing means in the direction of an arrow F.

Here, the position of the second latch 81 shown in FIG. 1 is a position where it can be engaged with the full-open striker 69, and the second latch 81 in the state where it is not restrained from the outside is energized by the third energizing means to return to the position shown in FIG. 1.

Besides, a second pole 83 is rotatably disposed on the baseplate 61. A protrusion 83a of the second pole 83 is engaged with a protrusion 81b of the second latch 81 which has been engaged with the full-open striker 69 and has been rotated to the lock position, and the second pole restrains the second latch 81 to the lock position. The second pole 83 is energized by the not-shown fourth energizing means in such a direction (direction of an arrow G) that the protrusion 83a is engaged with the protrusion 81b of the second latch 81.

When the protrusion 83a of the second pole 83 is engaged with the protrusion 81b of the second latch 81, the rotation of the second latch 81 in the direction of the arrow F is prohibited.

In a case where the vehicle is an automobile, a cable 85 driven by its inner handle, outer handle or the like is connected to the second pole 83.

(Window Regulator)

Figure 4:
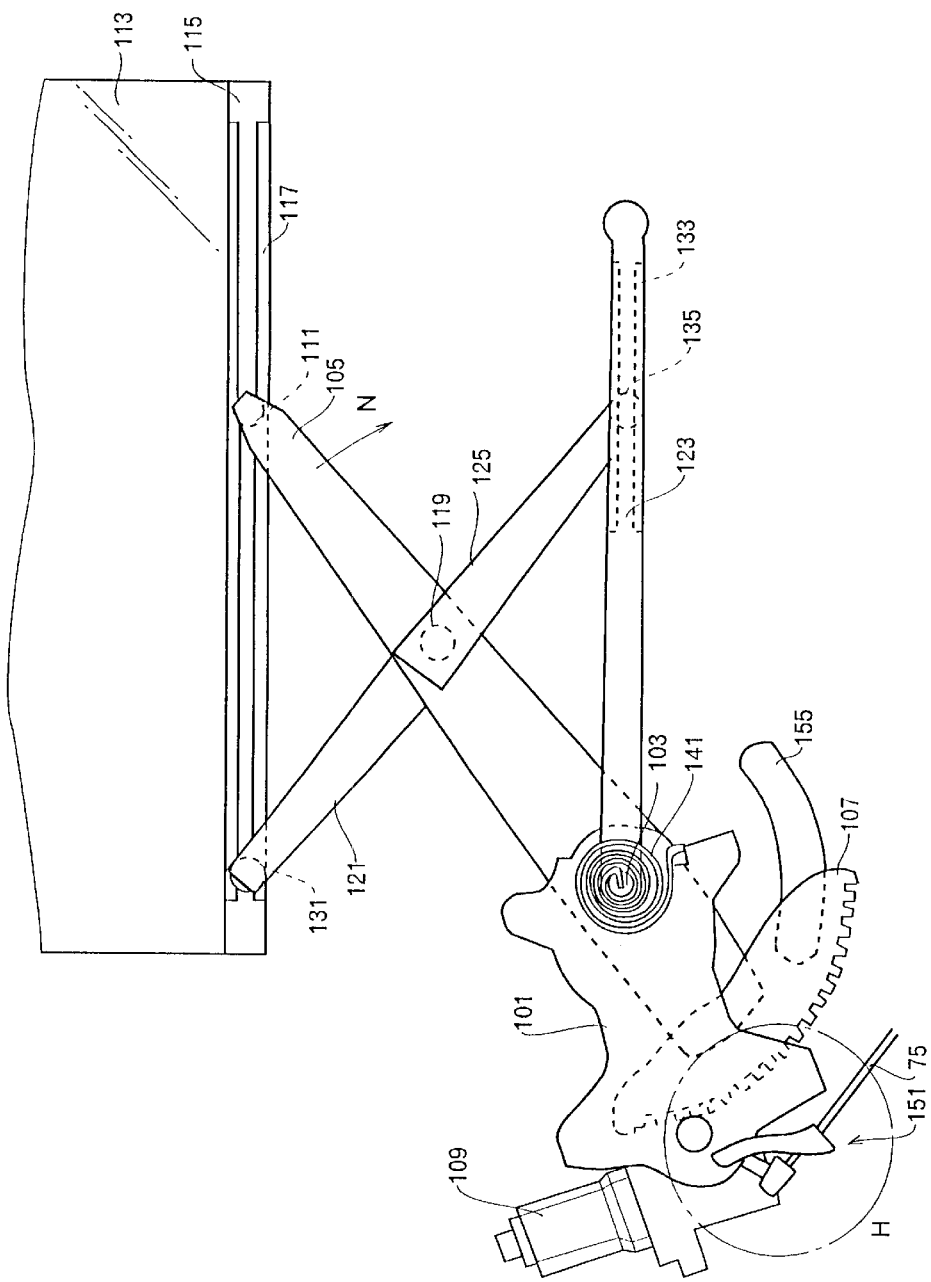
FIG. 4 is a view showing the whole structure of a window regulator and an intermediate stopper control mechanism in an embodiment of the invention.

In this embodiment, the slide door is provided with an X-arm type power window regulator as shown in FIG. 4. In FIG. 4, a pin 103 is rotatably disposed on a base plate 101 attached to an inner panel of the slide door. An intermediate portion of a lift arm 105 is fixed to the pin 103.

A driven gear 107 is fixed to one rotation end of the lift arm 105. This driven gear 107 is engaged with a pinion 110 (see FIG. 5) disposed on an output shaft 109a (see FIG. 5) of a motor 109 disposed on the base plate 101, and is driven and rotated.

A roller 111 is disposed at the other rotation end of the lift arm 105, and this roller 111 is engaged with a guide 117 formed in a lift arm bracket 115 attached to a lower end of a window glass 113 in such a manner that it can move in the horizontal direction.

One end of an equalizer arm bracket 123 is rotatably attached to the pin 103 of the base plate 101. The other end of the equalizer arm bracket 123 is fixed to the inner panel of the slide door.

A pin 119 passing through the lift arm 105 is rotatably disposed between the pin 103 of the lift arm 105 and the roller 111, and a first equalizer arm 121 extending in the direction of the lift arm bracket 115 is fixed to one end of the pin 119.

A second equalizer arm 125 extending in the direction of the equalizer arm bracket 123 is fixed to the other end of the pin 119.

Thus, the first and second equalizer arms 121 and 125 are made an integrated arm through the pin 119.

A roller 131 movably engaged with the guide 117 of the lift arm bracket 115 is disposed at the tip of the first equalizer arm 121, and a roller 135 movably engaged with a guide 133 formed in the equalizer arm bracket 123 is disposed at the tip of the second equalizer arm 125.

The lift arm 105 is energized in the direction to lift the window glass 113 by a balance spring 141 an inner end of which is hooked to the pin 103, an intermediate portion of which is spirally wound around the pin 103, and an outer end of which is hooked to the base plate 101.

In this window regulator, when the motor 109 is driven, the lift arm 105 to which the driven gear 107 is fixed rotates around the pin 103, so that the window glass 113 is moved up or down.

(Intermediate Stopper Control Mechanism)

An intermediate stopper control mechanism 151 is disposed at the rear side of the base plate 101. The intermediate stopper control mechanism 151 will be described with reference to FIG. 5. An L-shaped lever 153 having two arm portions is rotatably attached to an output shaft 109a of the motor 109. A cam plate 155 as a cam is fixed to the driven gear 107.

A roller 157 is disposed at the end of the one arm portion of the lever 153 in such a manner that it can abut on the cam plate 155. A cable 75 connected with the intermediate stopper mechanism 63 is attached to the other rotation end of the lever 153.

A spring 163 is held between a bracket 161 fixed to the base plate 101 and the lever 153. The lever 153 is energized in such a direction (direction of an arrow M in the drawing) that the roller 157 abuts on the cam plate 155. Incidentally, the lever 153 abuts on a cut raising portion 161a provided on the bracket 161 in the case where the roller 157 does not abut on the cam plate 155.

Figure 5:
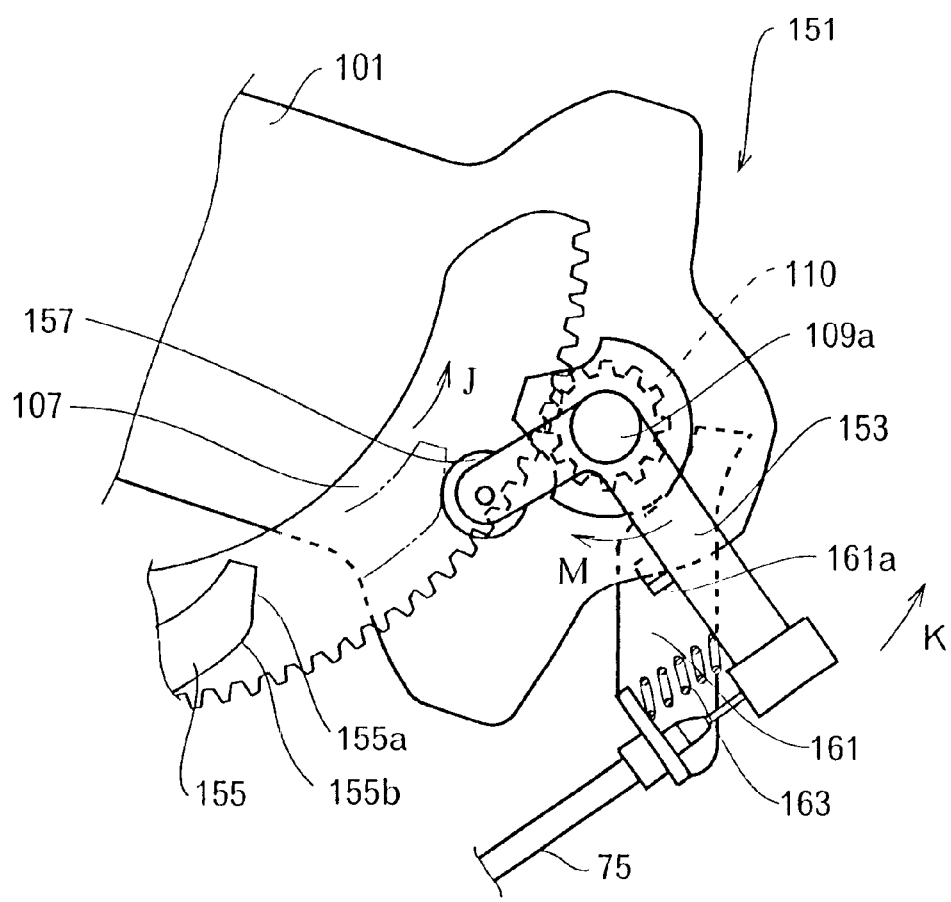
FIG. 5 is an enlarged view showing an H portion (intermediate stopper control mechanism) in FIG. 4 seen from the rear side.

With respect to the intermediate stopper control mechanism 151 having such a structure, in the case where the motor 109 is driven in the direction to lower the window glass 113 in the full-close state, that is, in the case where the lift arm 105 is moved in the direction of an arrow N in FIG. 4, the driven gear 107 is moved in the direction of an arrow J in FIG. 5.

By this, the cam plate 155 fixed to the driven gear 107 is moved from the position of a solid line in FIG. 5 to the position of a two-dot-chain line, so that the lever 153 is rotated in the direction of an arrow K and the cable 75 is pulled in.

The cam plate 155 is composed of a slant surface 155a and an arc surface 155b, and the slant surface 155a first abuts on the roller 157, so that the lever 153 is driven to rotate in the direction of the arrow K. Then, it is designed such that the roller 157 reaches the arc surface 155b at the point of time when the window glass 113 is lowered to a predetermined position.

Thus, even if the window glass 113 is lowered to exceed the predetermined position, the position of the lever 153 continues to be kept, and the cable 75 does not continue to be further pulled.

(Operation of Intermediate Stopper Mechanism)

Figure 2:
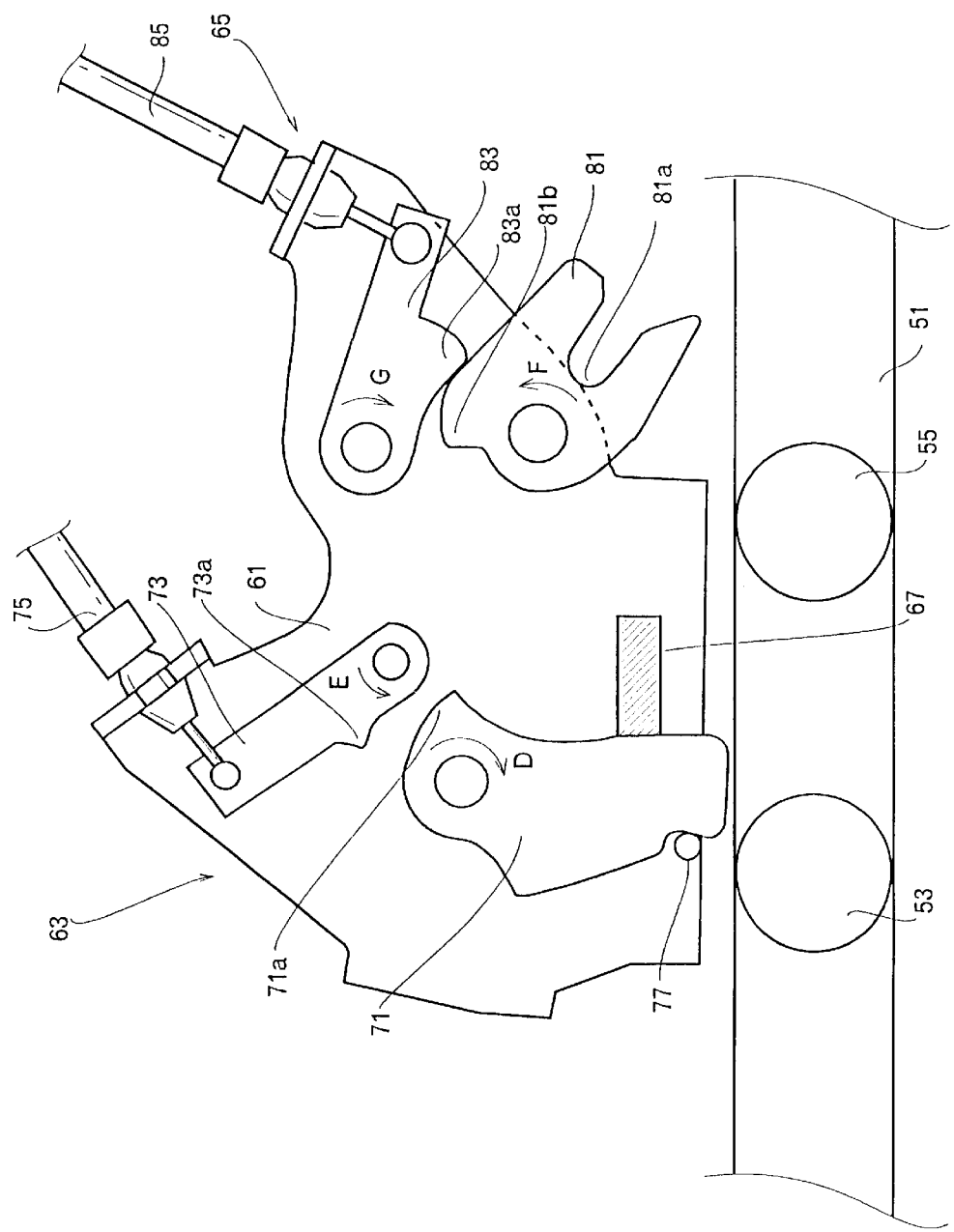
FIG. 2 is a view for explaining the operation of the intermediate stopper mechanism in FIG. 1.

The operation of the intermediate stopper mechanism 63 will be described with reference to FIG. 1 and FIG. 2. When the slide door is in the full-close position and the window glass 113 is in the full-close state, as shown in FIG. 1, the first latch 73 is engaged, by the energizing force of the second energizing means, with the first pole 71 which has rotated to the position where it cannot abut on the intermediate striker 67.

Here, when the window glass 113 is lowered to the predetermined position, the cable 75 is pulled in by the intermediate stopper control mechanism 151, the first latch 73 is driven in such a direction (clockwise direction of FIG. 1) that the first latch 73 is separated from the first pole 71, and at the point of time when the window glass exceeds the predetermined position, the engagement with the first pole 71 is released. By this, when the restraint by the pole pushing-back pin 68 disappears, the first pole 71 is rotated by the energizing force of the first energizing means until it abuts on the stopper pin 77, and comes to have the state where it can abut on the intermediate striker 67.

As the slide door moves in the opening direction, the first pole 71 goes away from the pole pushing-back pin 68, so that it rotates until it abuts on the stopper pin 77. When moving further, as shown in FIG. 2, the first pole abuts on the intermediate striker 67, and is put into an intermediate lock state. By this, the movement of the slide door is prohibited halfway.

Here, in order to release the intermediate lock state, the slide door is moved in the closing direction, and is returned to the position of FIG. 1. By this, the first pole 71 is pressed by the pole pushing-back pin 68 disposed at the vehicle side, the first pole 71 is rotated in the opposite direction to the direction of the arrow D, the first latch 73 is again engaged with the first pole 71, and the intermediate lock state is released.

(Operation of Full-open Stopper Mechanism)

The operation of the full-open stopper mechanism 65 will be described with reference to FIGS. 1 to 3.

When the slide door is not in the full-open state, the second latch 81 is, by the energizing force of the third energizing means, in the position (position of FIG. 1 and FIG. 2) where it can engage with the full-open striker 69.

When the slide door is moved in the full-open direction, the full-open striker 69 is engaged with the engaging groove 81a of the second latch 81, and further, the second latch 81 is rotated in the clockwise direction.

Figure 3:
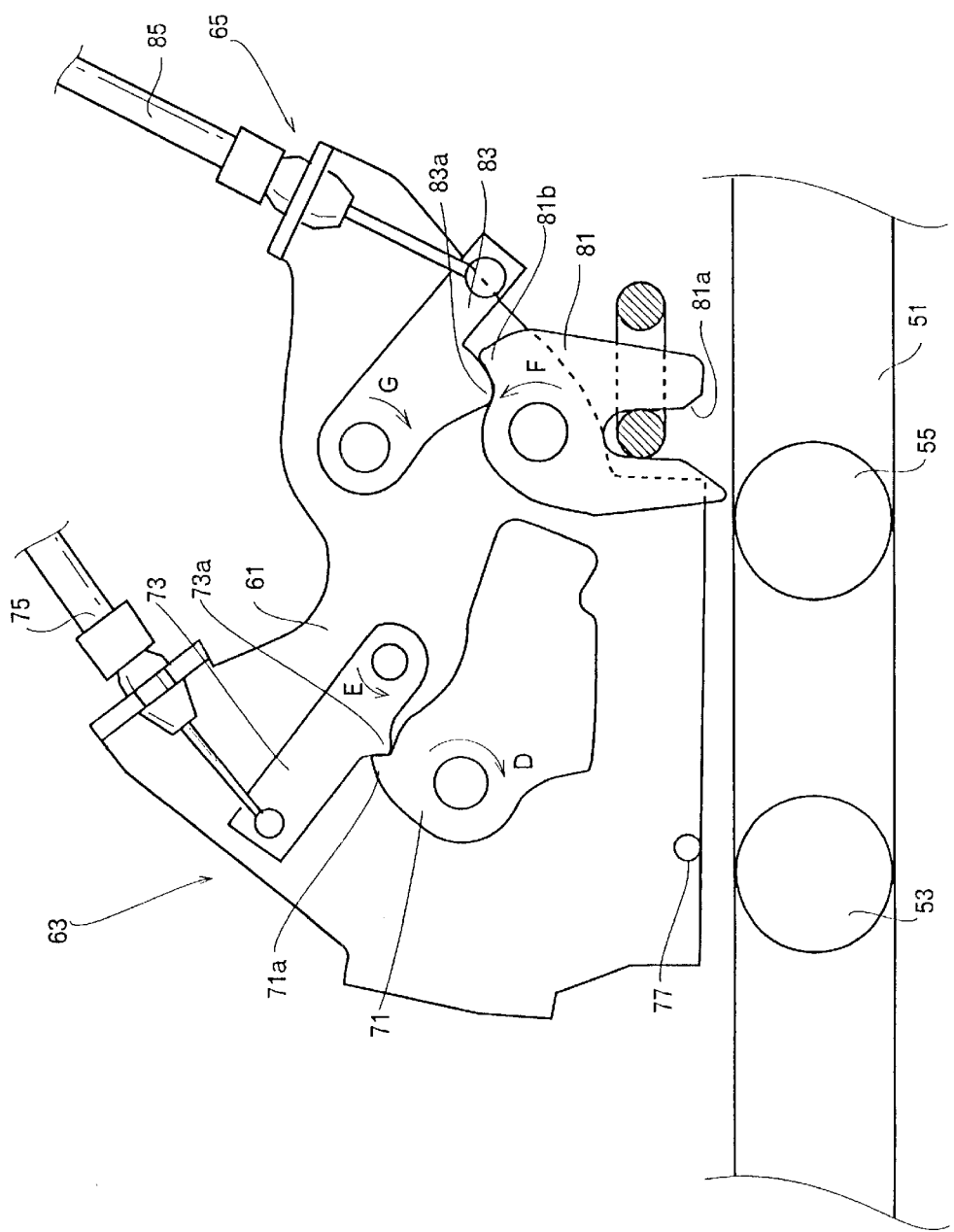
FIG. 3 is a view for explaining the operation of the full-open stopper mechanism in FIG. 1.

When the second latch 81 is rotated, as shown in FIG. 3, the second pole 83 is engaged with the second latch 81 by the energizing force of the fourth energizing means, so that rotation of the second latch 81 in the direction of the arrow F is prohibited, and the full-open lock state is obtained.

In order to release the full-open lock state, an inside handle or outside handle is operated. Then, the cable 85 is pulled in, so that the engagement of the second pole 83 with the second latch 81 is released, the second latch 81 becomes possible to rotate in the direction of the arrow F, and the full-open lock state is released. Thus, the slide door can be moved in the closing direction.

As described above, the slide door of this embodiment has effects as described below.

First, since the intermediate stopper mechanism 63 is constituted by the first pole 71 and the first latch 73, a halfway state does not occur at the switching. Thus, as compared with the conventional slide door having a halfway state at the switching, an abnormal sound is not generated, the durability of parts is improved, and further, an operating force for moving the slide door is not changed.

Moreover, when the intermediate stopper mechanism 63 is attached, it is not necessary to carry out troublesome adjustment of an attachment state, and the attachment operation is also facilitated.

Moreover, since the movement range of the first pole 71 can be set irrespective of the pulling amount of the cable 75, the intermediate stopper mechanism 63 can be made compact, and saving in space can be realized.

Moreover, the energizing force of the first energizing means for energizing the first latch 73 is sufficient only if the first latch 73 is engaged with the first pole 71, and a very large energizing force is not required. Thus, a small force is sufficient to lower the window glass 113.

Moreover, since the intermediate stopper control mechanism 151 is attached to the base plate 101 of the window regulator, the occupied space can be made small. Besides, by adjusting the position and shape of the cam plate 155, the driving amount of the intermediate stopper control mechanism can be arbitrarily adjusted, so that the assembling is also easy.

Since the cam mechanism constituted by the cam plate 155 and the lever 153 engaged with this cam plate 155 is used, large energy such as to shrink the spiral spring as in the prior art becomes unnecessary, and the change in operation force of the window regulator becomes small.

Besides, in the foregoing embodiment, since the full-open stopper mechanism 65 is included, effects as described below can also be obtained.

First, the energizing force of the third energizing means for energizing the second latch 81 is sufficient only if the second latch 81 is moved to the position where it can be engaged with the full-open striker 69, and a very large energizing force is not required. Thus, the change of the operation force of the slide door in the case where the full-open stopper mechanism 65 is put in the lock state is not changed very much from a previous one, and the operationally is excellent.

Moreover, in the case where the full-open stopper mechanism 65 becomes the unlock state from the lock state, since the second latch 81 is moved by the energizing force of the third energizing means, the operation force of the slide door is not changed.

Furthermore, since the intermediate stopper mechanism 63 can set the movement range of the first pole 71 irrespective of the pulling amount of the cable 75, and can be made compact, the full-open stopper mechanism 65 is disposed adjacently and both are disposed on the same base plate 61, so that the attachment becomes easy.

Figure 6:
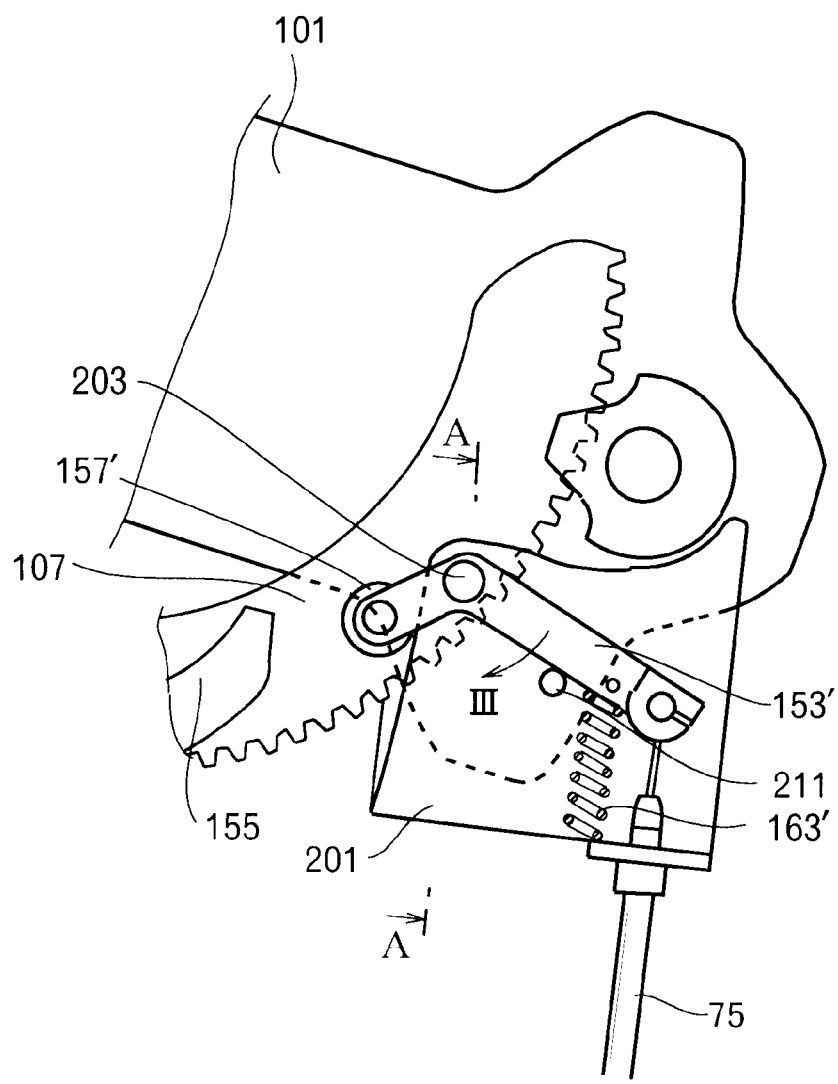
FIG. 6 is a view showing an intermediate stopper control mechanism of another embodiment.
Figure 7:
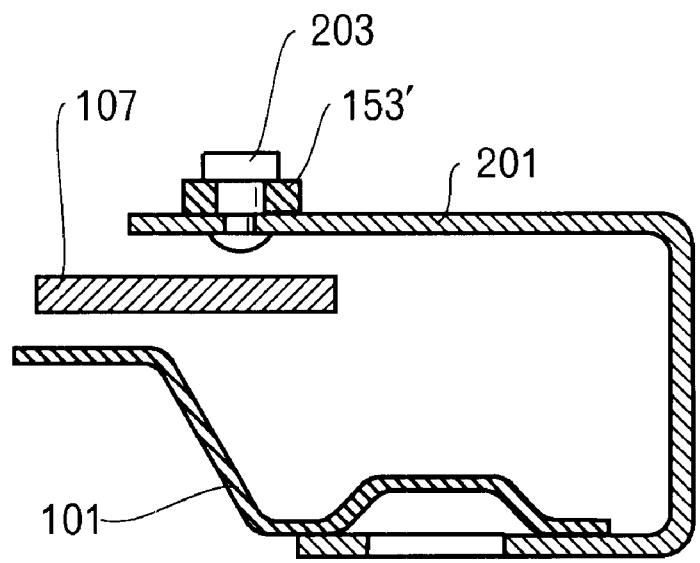
FIG. 7 is a sectional view taken along a cutting line A—A in FIG. 6.
Figure 8:
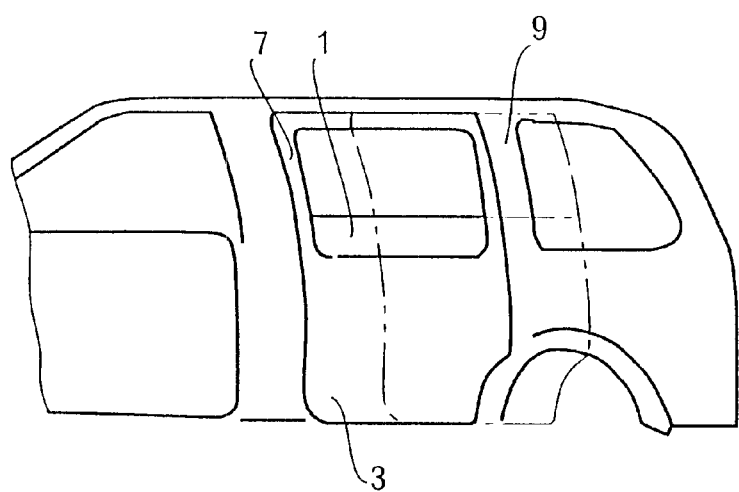
FIG. 8 is a view showing a slide door of a vehicle.
Figure 9:
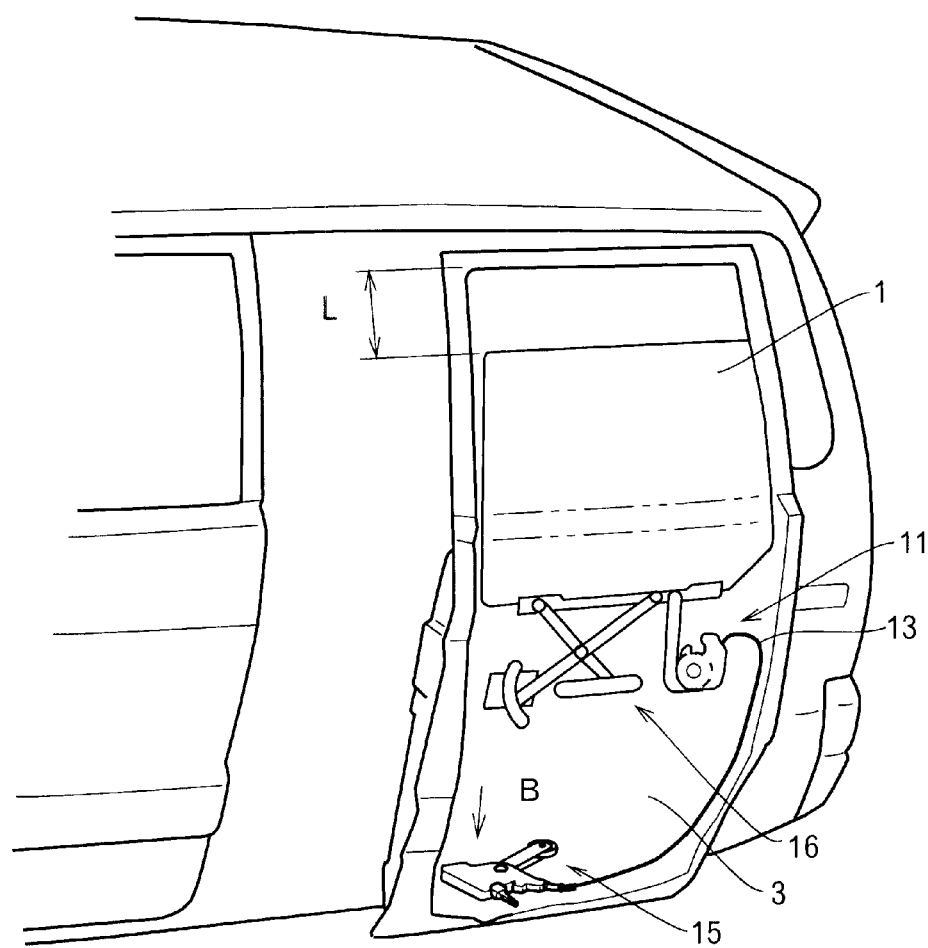
FIG. 9 is a view showing the whole structure of a conventional slide door in which an intermediate stopper mechanism is provided.
Figure 10:
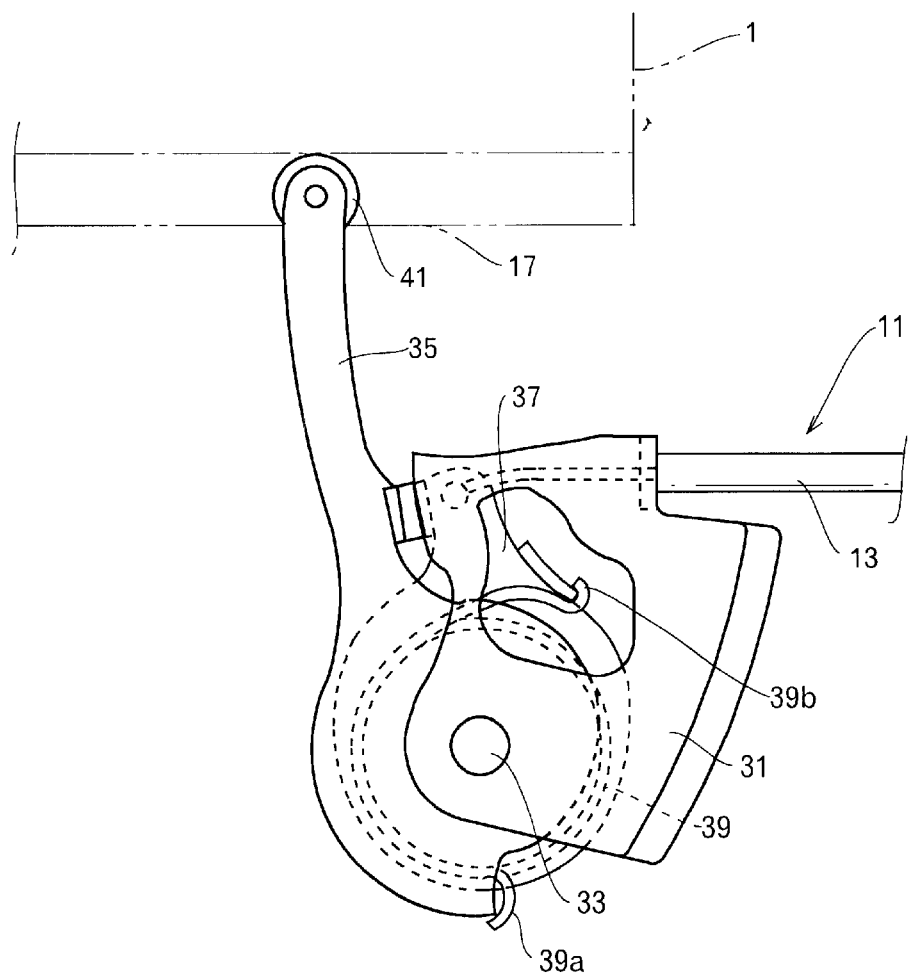
FIG. 10 is a view showing an intermediate stopper control mechanism in FIG. 9.
Figure 11:
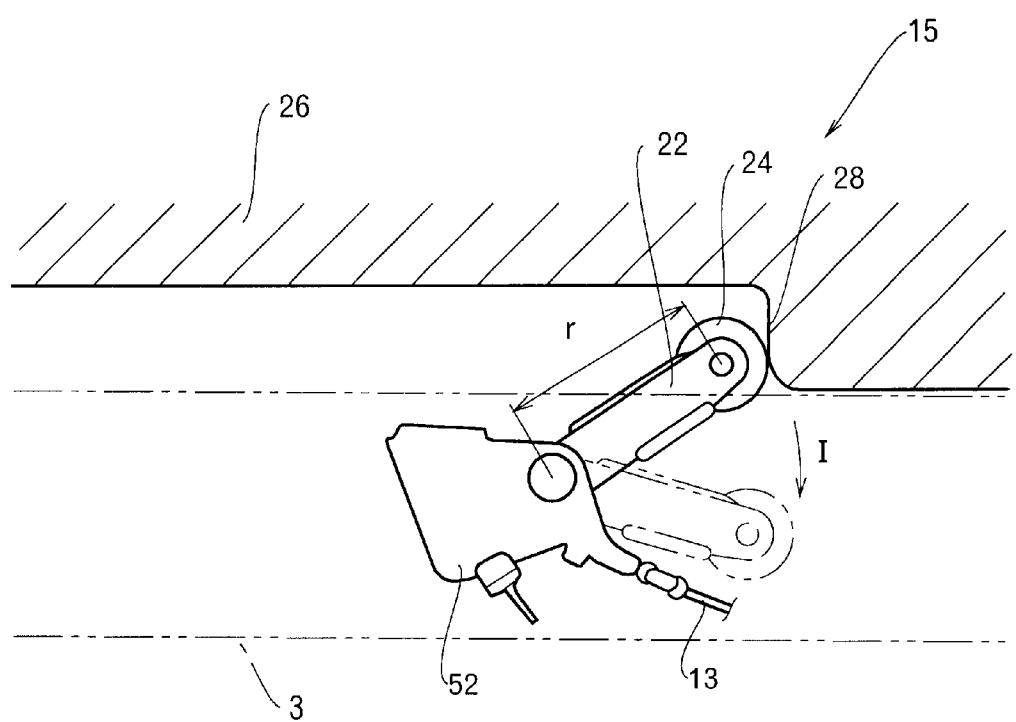
FIG. 11 is a view seen in the direction of an arrow B of FIG. 9, and is a view for explaining the intermediate stopper mechanism.
Figure 12:
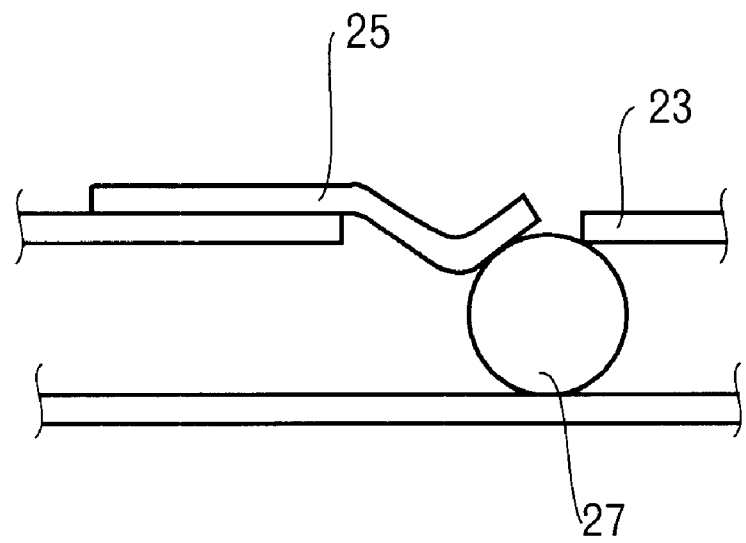
FIG. 12 is a view showing a full-open lock mechanism in a conventional slide door.

Another embodiment of the present invention is shown in FIG. 6 and FIG. 7. This relates to a portion of an intermediate stopper control mechanism, and a remarkable difference from the foregoing first embodiment is an attachment position of a lever. Thus, the same portions as the first embodiment are designated by the same reference characters and their duplicate description is omitted.

A lever 153' is rotatably attached to a bracket 201 disposed at a lower portion of a base plate 101 by using a pin 203.

A spring 163' has one end engaged with the bracket 201, and the other end of the spring is engaged with the lever 153', so that the lever 153' is energized in such a direction (direction of an arrow 111 in FIG. 6) that a roller 157' abuts on a cam plate 155, and in the case where the roller 157' does not abut on the cam plate 155, it abuts on a stopper 211 disposed on the bracket 201.

Also in such a structure, similar effects to the first embodiment can be obtained. Furthermore, since constituent parts other than the cam plate 155 disposed on the driven gear 107 are concentrated on the bracket 201, later attachment becomes easier than the first embodiment.

Incidentally, the present invention is not limited to the foregoing embodiments. For example, in the foregoing embodiments, although the spring 163, 163' is provided so as to press the roller 157, 157' of the lever 153, 153' to the cam plate 155, in the case where the intermediate stopper mechanism includes energizing means for constantly pulling the cable, the spring 163, 163' is unnecessary.

Moreover, for example, also in the case where a positive motion cam mechanism composed of a groove cam and a follower movably engaged with this is adopted, the spring 163, 163' can be omitted.

Industrial Applicability

As described above, the slide door of the present invention is suitable for use in a vehicle slide door of a type where a window glass is lowered and a window is opened. Particularly, the invention is suitable for use in a side door of an automobile such as a one-box car.

What is claimed is:

1. A slide door comprising an intermediate stopper mechanism, the intermediate stopper mechanism comprising:

an intermediate striker disposed at a vehicle side;
a first pole rotatably disposed at a slide door side and detachably engaged with the intermediate striker;
a first energizing means for energizing the first pole so that the first pole is returned to a position where it can abut on the intermediate striker;
a first latch which is a latch to engage with the first pole rotated to a position where it cannot abut on the intermediate striker and to restrain the first pole to that position, and which releases restraint of the first pole when a window glass of the slide door is opened to a predetermined position; and
a second energizing means for energizing the first latch in a direction to make engagement with the first pole.

2. The slide door according to claim 1, further comprising a pole returning member disposed at the vehicle side, the pole returning member abutting on the first pole in the slide door moving in a closing direction, and rotating the first pole from a position where it can abut on the intermediate striker to a position where it cannot abut.

3. The slide door according to claim 1, further comprising an intermediate stopper control mechanism for driving the intermediate stopper mechanism in accordance with an opening degree of the window glass, the intermediate stopper control mechanism being attached to a window regulator.

4. The slide door according to claim 3, wherein the intermediate stopper control mechanism includes a cam disposed at a movable portion of the window regulator, and a lever which is rotatably disposed at a fixed portion of the window regulator, includes an arm portion engagable with the cam, and is connected with the intermediate stopper mechanism through a transmission member.

5. The slide door according to claim 4, wherein the cam includes a slant surface for rotating the arm portion of the lever, and an arc surface for holding the lever at that position, and rotation of the arm portion is transmitted to the first latch in the intermediate stopper mechanism through the transmission member.

6. The slide door according to claim 1, further comprising a full-open stopper mechanism, the full open stopper mechanism comprising:

a full-open striker disposed at the vehicle body side;
a second latch rotatably disposed at the slide door side and detachably engaged with the full-open striker;
a third energizing means for energizing the second latch so as to return the second latch to a position where it can abut on the full-open striker;
a second pole which is engaged with the second latch engaged with the full open striker and rotated to a lock position, and which restrains the second latch to the position; and
a fourth energizing means for energizing the second pole in a direction to make engagement with the second latch.

7. The slide door according to claim 6, wherein the intermediate stopper mechanism and the full-open stopper mechanism are disposed on the same base plate.

* * * * *